US008027416B2

(12) United States Patent
Mason et al.

(10) Patent No.: US 8,027,416 B2
(45) Date of Patent: *Sep. 27, 2011

(54) STRUCTURE FOR DATA COMMUNICATIONS SYSTEMS

(75) Inventors: James S. Mason, Eastleigh (GB); Louis C. Hsu, Fishkill, NY (US); Phil J. Murfet, Kings Somborne (GB); Gareth J. Nicholls, Brockenhurst (GB)

(73) Assignee: International Business Machines Corporation, Armonk, NY (US)

( * ) Notice: Subject to any disclaimer, the term of this patent is extended or adjusted under 35 U.S.C. 154(b) by 746 days.

This patent is subject to a terminal disclaimer.

(21) Appl. No.: 12/043,166

(22) Filed: Mar. 6, 2008

(65) Prior Publication Data

US 2008/0146181 A1    Jun. 19, 2008

Related U.S. Application Data

(63) Continuation-in-part of application No. 11/737,319, filed on Apr. 19, 2007.

(30) Foreign Application Priority Data

Jun. 10, 2006    (GB) .................................. 0611508.3

(51) Int. Cl.
H04L 27/08    (2006.01)
(52) U.S. Cl. ........................................................ 375/345

(58) Field of Classification Search .................. 375/316, 375/345, 340; 330/250, 278, 284; 455/130, 455/230, 232.1, 234.1, 239.1, 240.1
See application file for complete search history.

(56) References Cited

U.S. PATENT DOCUMENTS

| 6,897,712 | B2 | 5/2005 | Ficken et al. | |
|---|---|---|---|---|
| 7,498,882 | B2 * | 3/2009 | Dally et al. | 330/279 |
| 2002/0136251 | A1 | 9/2002 | Green et al. | |
| 2004/0125891 | A1 * | 7/2004 | Nishikido | 375/320 |
| 2005/0009483 | A1 | 1/2005 | Eilts et al. | |
| 2005/0093582 | A1 | 5/2005 | Bock | |
| 2006/0067440 | A1 * | 3/2006 | Hsu et al. | 375/345 |

FOREIGN PATENT DOCUMENTS

WO    WO03030356 A2    4/2003

* cited by examiner

*Primary Examiner* — David C. Payne
*Assistant Examiner* — Vineeta Panwalkar
(74) *Attorney, Agent, or Firm* — Yuanmin Cai

(57) ABSTRACT

A machine-readable medium thereupon stored a design structure; the design structure includes a receiver for a data communications system. The receiver includes a data path for receiving a data signal from a data channel, the data path comprising an automatic gain control (AGC) loop; and, a signal detector for generating a data valid signal indicative of the validity of the data signal in response to detection of the data signal on the channel exceeding a threshold and in dependence upon gain information from the AGC loop in the data path.

6 Claims, 6 Drawing Sheets

STRUCTURE FOR DATA COMMUNICATIONS SYSTEMS

CROSS-REFERENCE TO RELATED APPLICATIONS

The present application is a Continuation-In-Part (CIP) application of U.S. patent application Ser. No. 11/737,319 filed Apr. 19, 2007 with the United States Patent and Trademark Office, which claims the benefit of priority of United Kingdom Patent Application No. 0611508.3 filed Jun. 10, 2006 with the United Kingdom Patent Office. The content of both applications are incorporated herein by reference in their entireties.

FIELD OF THE INVENTION

The present invention generally relates a design structure of data communications systems and in particularly to a design structure of receivers for data communications systems.

BACKGROUND OF THE INVENTION

A conventional data communication system comprises a first and a second node interconnected by an intervening serial data communication channel, such as a wire link or optical fiber link. The first node typically comprises a first data processing unit (DPU) connected to a transmitter. The output of the transmitter is connected to the channel. The transmitter typically comprises a data path for supplying serial input data from the first DPU to the channel. Likewise, the receiver typically comprises a data path for supplying data received from the channel to the second DPU.

The receiver typically comprises an up channel driver connected to the channel. Similarly the transmitter typically comprises an up channel receiver connected to the channel. The up channel driver and the up channel receiver, together with the channel, constitute an up channel communication subsystem for providing communication between the receiver and the transmitter. The up channel communication subsystem is typically employed by the receiver to send control data to the transmitter. The first DPU typically supplies control signals to the transmitter. Similarly, the second DPU typically supplies control signals to the receiver. The first node also typically comprises a receiver. Likewise, the second node also typically comprises a transmitter. In each node, the transmitter and the receiver are typically integrated into a unitary transceiver. The first and second nodes may comprise server computer systems in a data communication network.

In operation, data is serially communicated between the first and second nodes via the channel. The transmitter and receiver each typically comprise a serializer-deserializer (SERDES). In operation, the SERDES in the transmitter converts parallel data words into a serial bit stream for communication on the channel. In the receiver, the SERDES converts a bit stream received from the channel into parallel data words. Each SERDES is typically implemented in one or more integrated circuits. As improvements continue to be made in semiconductor technology, the performance of such integrated circuits continues to increase. Accordingly, each successive generation of SERDES is capable of handling an increased data rate.

The receiver comprises a signal detector. The signal detector comprises an amplifier and a comparator. In operation, the output from the amplifier is compared to a threshold value Vt by the comparator. The comparator has a hysteresis between its upper and lower switching thresholds. If the hysteresis width is 2Vh, then the upper and lower switching thresholds of the comparator are Vt−Vh and Vt+Vh. Signals less than the lower threshold are determined as invalid. Signals greater than the upper threshold are determined to be valid. There is a band of uncertainty between the upper and lower thresholds where the signal cannot be determined to be good or bad. The width of this band depends on range of circuit parameters including, for example, offset voltage. U.S. Pat. No. 6,897,712 and US20050093582A1 describe examples of conventional signal detectors.

Performance improvement techniques such as Decision Feedback Equalization (DFE) are employed in many data communication system to counter losses within the channel in the interests of achieving higher data rates. A receiver for performing DFE typically comprises an automatic gain control (AGC) loop having a variable gain amplifier (VGA). US20020136251 describes an example of an AGC for use with a signal detector. WO03030356A2 describes another conventional example of an AGC. US20050009483A1 describes an example of conventional AGC calibration.

A typical receiver comprises a signal detector and a cable detector. In operation, the signal detector detects the presence and absence of valid signals on the channel. A valid or good signal is a signal having a pulse height exceeding a preset upper threshold. An invalid or bad signal is a signal having a pulse height below a preset lower threshold. Depending on circuit accuracy, there is normally a region of uncertainty between the lower and upper thresholds in which a signal cannot be declared bad or good. This region is conventionally specified by end users.

In operation, the signal detector enhances the receiver by preventing the processing of potentially unreliable signals. Specifically, in response to detection of the received signal level falling below the lower threshold, the signal detector alerts the receiving node to stop data processing. In such a situation, the received data may not be valid for one or more of a variety of reasons, including, without limitation, excessive noise in the received signal, excessive cross talk between channels, and signal loss in the channel. The cable detector can be employed to detect whether a cable carrying the channel is unplugged or shorted.

It is increasingly difficult to integrate this functionality into receiver designs as performance increases and available silicon area reduces. There is continuing demand for increasing the data rate that the signal detector is capable of handling without adversely affecting the accuracy with which the signal detector applies the upper and lower thresholds. These thresholds are relatively small. Therefore, the signal detector typically comprises an amplifier to amplify the input signal to facilitate subsequent threshold detection. As performance increases, the power consumption, and area of the amplifier also tends to increase. It would be desirable to improve signal detection performance and simultaneously to alleviate pressure for increased silicon real estate occupancy and power.

SUMMARY OF THE INVENTION

In accordance with the present invention, there is now provided a design structure of a receiver for a data communications system, the receiver comprising: a data path for receiving a data signal from a data channel, the data path comprising an automatic gain control (AGC) loop; and, a signal detector for generating a data valid signal indicative of the validity of the data signal in response to detection of the data signal on the channel exceeding a threshold and in dependence upon gain information from the AGC loop in the data path.

In a preferred embodiment of the present invention, the signal detector comprises a comparator for comparing the data valid signal to the threshold. The receiver may comprise a variable signal source for setting the threshold in dependence upon the gain information from the data path.

The data path may comprise a variable gain amplifier (VGA) for amplifying the data signal, the VGA having a gain control input connected to the AGC loop, the output of the VGA being connected to the comparator, the receiver further comprising logic connected to the gain control input of the VGA for alternately varying the gain of the VGA via the AGC loop in a data processing period and setting the gain of the VGA to a reference value during a signal sensing period, the reference value being defined via the AGC loop during a calibration of the receiver. Alternatively, the data path may comprise a first variable gain amplifier (VGA) for amplifying the data signal, the first VGA having a gain control input connected to the AGC loop; and, the signal detector may comprise a second VGA for amplifying the data signal, the receiver further comprising logic for setting the contents of the register value defined via the AGC loop during a calibration of the receiver. In a particularly preferred embodiment of the present invention, there is provided circuitry for applying a preset test signal to the data path and the signal detector during calibration. The AGC loop preferably comprises decision feedback equalization.

The present invention extends to a design structure of a data communications systems comprising a first data processing node and a second data processing node interconnected by a data communications channel, wherein at least one of the first and second nodes comprising a receiver as herein before described.

Viewing the present invention from another aspect, there is now provided a method for data communications, the method comprising: receiving a data signal in a data path having an automatic gain control (AGC); and, generating, using a signal detector, a data valid signal indicative of the validity of the data signal in response to detection of the data signal on the channel exceeding a threshold and in dependence upon gain information from the AGC loop in the data path.

The present invention also extends to a design structure of an apparatus comprising a plurality of electronic circuits including an amplifier for receiving and amplifying a data signal and an automatic gain control (AGC) loop for controlling the gain of the amplifier wherein at least one parameter in at least one other of the plurality of electronic circuits is variable in dependence on gain information from the AGC loop.

In a preferred embodiment of the present invention, there is provided a design structure of a data communications system comprising a receiver having a signal detector and a data path. The signal detector comprises a preamplifier stage. The preamplifier stage comprises a VGA. The data path comprises an AGC. In operation, gain information from the AGC of the data path is derived from a known signal from preexisting circuitry such as preexisting up channel driver and/or wrap path circuitry. The gain information is employed to control the gain of the preamplifier stage. This reduces overall circuit complexity and improves the accuracy of the signal detector Embodiments of the present invention to be described shortly address the problem of performing accurate signal detection on relatively high data rates, such as data rates of the order of 6 Gb/s and beyond. However good accuracy and high speed operation is difficult to achieve by conventional means.

Many conventional schemes are compromised in terms of accuracy because of technology and speed constraints.

In a particularly preferred embodiment of the present invention, there is provided a design structure of a receiver for a data communications system, the receiver comprising: a data path having an AGC loop receiving an input signal from a communication channel; and a signal detector receiving the input signal in parallel to the data path. In operation, the signal detector detects any loss of the input signal. The AGC is not directly involved in that detection. However, gain information from the AGC is employed to determine and control switching thresholds of the signal detector by varying the gain of a VGA within the signal detector. In particularly preferred embodiments of the present invention, the circuitry of the AGC and the VGA in the signal detector are made at least similar and preferably identical in order that they track each other well. In operation, the AGC sets its output at a known level. If the input signal to the AGC is also known, the gain of the AGC can then be determined. The AGC gain thus determined is then used to control the gain in, and therefore the switching thresholds of the signal detector. The accuracy of the signal detector is thereby improved. In another preferred embodiment of the present invention, the function of the VGA in the signal detector is integrated with the AGC in the data path in the interests of simplicity.

BRIEF DESCRIPTION OF THE DRAWINGS

Preferred embodiments of the present invention will now be described, by way of example only, with reference to the accompanying drawings, in which.

DETAILED DESCRIPTION OF THE INVENTION

Figure 1:
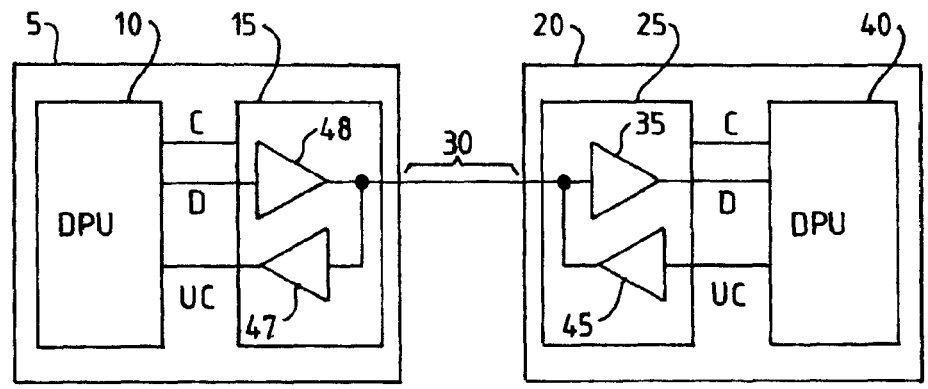
FIG. 1 is a block diagram of a data communications system.

Referring to FIG. 1, a data communication system comprises a first data processing node 5 connected to a second data processing node 20 via a communication channel 30. The channel 30 may be wired or wireless. The first node 5 comprises a first data processing unit (DPU) 10 connected to a transmitter 15. The output of the transmitter 15 is connected to the channel 30. The transmitter 15 comprises a data path 48 for supplying serial input data D from the first DPU 10 to the channel 30. Likewise, the receiver 25 comprises a data path 35 for supplying data D received from the channel 30 the second DPU 40. The first DPU 10 and the second DPU 40 may be server computer systems, for example.

In operation, the data D is serially communicated between the first node 5 and second node 20 via the channel 30. The first node 5 and the second node 20 each typically comprise a serializer-deserializer (SERDES). In operation, the SERDES in the first node 5 converts parallel data words into a serial bit stream for communication on the channel 30. In the second node 20, the SERDES converts a bit stream received from the channel 30 into parallel data words. The SERDES in the first node 5 may be integral to the first DPU 10 or the transmitter 15. Similarly, the SERDES in the second node 20 may integral to the second DPU 40 or the receiver 25.

The receiver 25 comprises an up channel driver 45 connected to the channel 30. Similarly the transmitter 5 comprises an up channel receiver 47 connected to the channel 30. The up channel driver 45 and the up channel receiver 47, together with the channel 30, constitute an up channel communication subsystem for providing communication between the receiver 25 and the transmitter 15. The up channel communication subsystem can be employed by the receiver 25 to send control data to the transmitter 15. The control data can be employed, for example, to inform the transmitter 15 to stop sending data, to resend the last group of data, or to set driver finite impulse response (FIR) tap coefficients in the interests of optimizing signal integrity and power performance.

The first DPU 10 supplies control signals C to the transmitter 15. Similarly, second DPU 40 supplies control signals C to the receiver 25. It will be appreciated that the first node 5 may also comprise a receiver. Likewise, it will be appreciated that the second node 20 may also comprise a transmitter. The transmitter and receiver in such nodes may be integrated into a unitary transceiver. The channel 30 as shown is single ended. However, in other embodiments of the present invention, the channel 30 may be differential.

Figure 2:
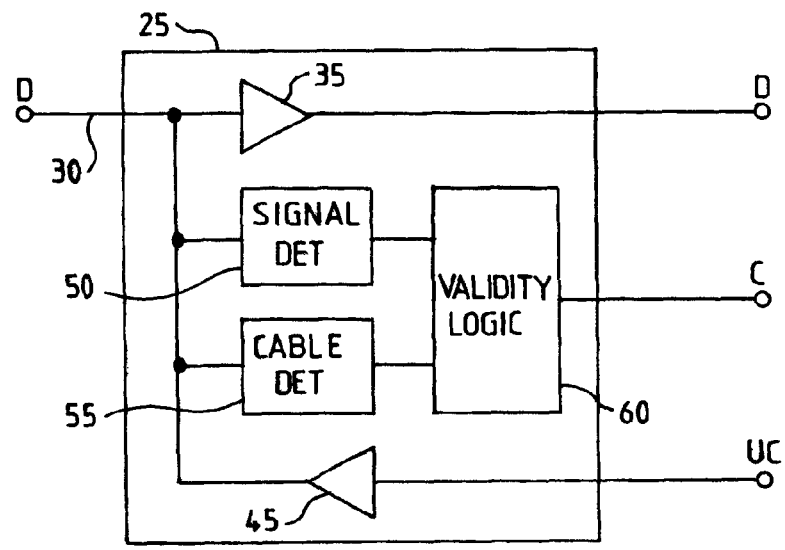
FIG. 2 is a block diagram of a receiver of the data communications system.

Referring to FIG. 2, in addition to the data path 35, the receiver 25 further comprises a signal detector 50 and a cable detector 55 both having inputs connected to the channel 30. The outputs of the signal detector 50 and the cable detector 55 are connected to validity logic 60.

Figure 3:
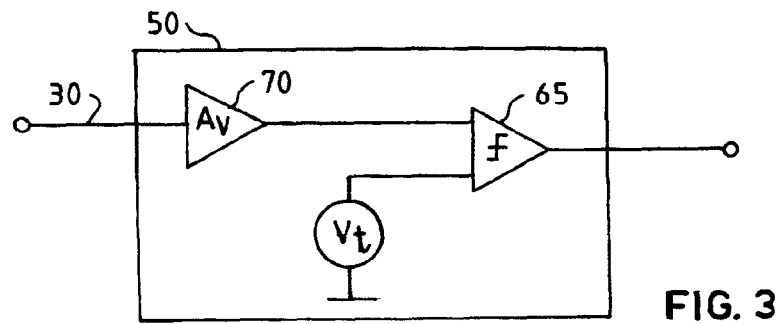
FIG. 3 is a block diagram of a signal detector of the receiver.

Referring to FIG. 3, the signal detector 50 comprises an amplifier 70 and a comparator 65. The amplifier 70 has a gain Av. In operation, the output of the amplifier 70 is compared to a threshold value Vt by the comparator 65. The comparator 65 has a hysteresis between its upper and lower switching thresholds. If the hysteresis width is 2Vh, then the upper and lower switching thresholds of the comparator 65 are Vt−Vh and Vt+Vh. Signals less than the lower threshold are determined as invalid. Signals greater than the upper threshold are determined to be valid. There is a band of uncertainty between the upper and lower thresholds where the signal cannot be determined to be good or bad. The width of this band depends on range of circuit parameters including, for example, offset voltage.

Referring the upper and lower switching thresholds to the input provides input switching levels of (Vt−Vh)/Av and (Vt+Vh)/Av. The amplifier 70 allows smaller input thresholds. This is desirable for some industry specifications such as Infiniband and allows more flexibility in the design of the comparator. However, a disadvantage of this approach is that demands a close tolerance in the gain of the amplifier 70 for accurate switching thresholds. Additionally, this approach also requires the signal detector 50 to operate at the incoming data rate. The combination of analog accuracy and high speed operation is difficult to achieve. Conventional solutions have required relatively high power and relatively large circuit area.

In a preferred embodiment of the present invention, calibration information from an automatic gain control loop (AGC) in the data path 35 is used to set the gain of the amplifier 70 accurately. In particularly preferred embodiments of the present invention, a variable gain amplifier (VGA) section of the AGC provides at least some of the functionality of the amplifier 70. This reduces the power and area requirements of the signal detector 50.

Figure 4:
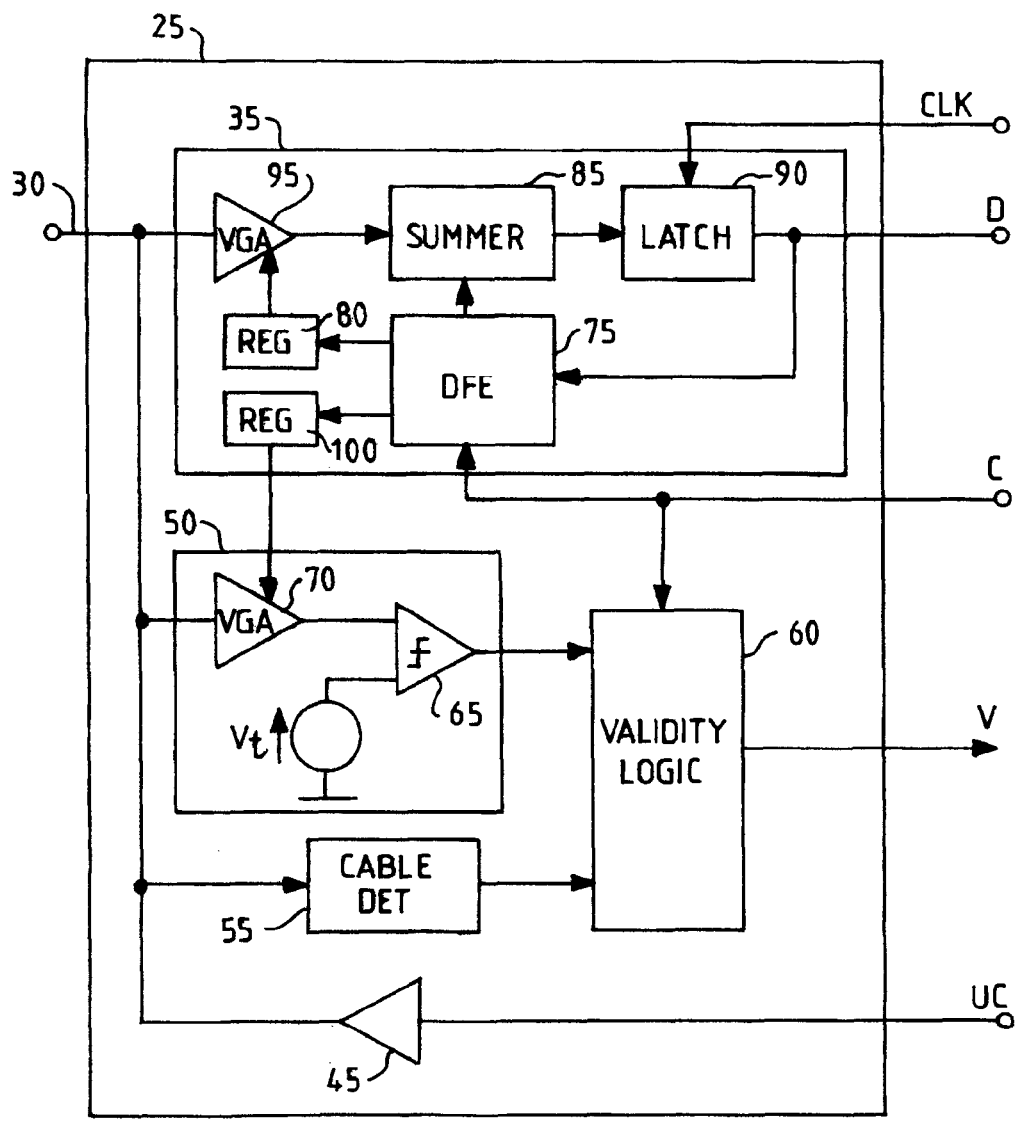
FIG. 4 is a detailed block diagram of a receiver of the data processing system.

Referring now to FIG. 4, in one preferred embodiment of the present invention, the data path 35 comprises a variable gain amplifier (VGA) 95 connected to the channel 30. The gain of the VGA 95 is digitally set by a digital vector supplied via a gain control input. The output of the VGA 95 is connected to a decision feedback equalization (DFE) summer 85. The output of the summer 85 is connected to a latch 90. The output of the latch is connected to DFE logic 75. The DFE logic 75 has outputs connected to the DFE summer 75 and registers 80 and 100. The output of the register 80 is connected to the gain control input of the VGA 95. The signal detector 50 comprises a variable gain amplifier (VGA) 70. The gain of the VGA 70 is digitally set by a digital vector supplied via a gain control input. The gain control input of the VGA 70 is connected to the output of the register 100.

In operation, the DFE logic 75 sets the contents of the registers 80 and 100 and supplies tap coefficients to the DFE summer 85. The DFE logic 75 and the register 80 collectively form an AGC feedback loop extending from the output of the latch 90 to the gain control input of the VGA 95. The DFE logic 75 comprises mixed signal circuitry for tuning the gain of the VGA 95 through the register 80. The output of the summer 85 is clocked into the latch 90 by a clock signal CLK. In preferred embodiments of the present invention, the clock signal CLK is recovered from the received signal by a clock recovery circuit (not shown). The validity logic 60 generates a validity signal V indicative of the validity of the received signal in dependence on the outputs of the comparator 65 and the cable detector 55. The DFE logic 75 and the validity logic 60 receive control signal inputs C from the second DPU 40.

The receiver 25 of FIG. 4 has a calibration mode of operation and a normal data processing mode of operation.

The calibration mode is triggered at power-on and following a signal detection failure.

The calibration mode may be initiated by a calibration command in the form of a binary control signal 300 from a second DPU 40. In the calibration mode, a test signal comprising a stream of pulses with defined shape, height, and pattern is fed, under the control of the second DPU 40, to the input of the VGA 95 via the up-channel driver 45 or other circuitry. The test signal is utilized to set a reference gain value of the VGA 95. Specifically, the gain of the VGA 95 is adjusted under the control of the DFE logic 75 until the DFE logic 75 detects a signal at the output of the latch 90 with a known offset applied to the summer 85. The latch 90, the summer 85, and the DFE logic 75 effectively act as a constant amplitude sensor. The digital value in the register 80 corresponding to the known input and output levels represents the reference gain of the VGA 95. The DFE logic 75 effectively comprises a comparator function having a reference set to the desired output of the VGA 95. The gain of the VGA 95 is adjusted by the DFE logic 75 until the comparator function just switches. For example, if the test signal has a known amplitude of 100 mV, the DFE logic 75 detects 300 mV signals, then a digital value indicative of a reference gain of 3 is set in the register 80. The DFE logic stores the reference gain information recorded in the register 80 into the register 100, thereby setting the gain of the VGA 70 to that established by the AGC in the data path. Calibration is then completed and the receiver 25 is placed in the data processing mode of operation.

In the data processing mode, the value stored in the register 100 is fixed. Therefore, then gain of the VGA 70 is fixed. However, the value of stored in the register 80, and therefore the gain of the VGA 95, is variable and controlled by the AGC loop. The signal detector 50 and the data path 35 operate simultaneously in parallel, with the data path 35 receiving incoming the data signal and the signal detector 50 simultaneously monitoring the incoming data signal for detection of a fault. In the event that a fault is detected, the output of the receiver is disabled or otherwise flagged as invalid via the valid signal output V of the validity logic 60. The signal detector 50 and the validity logic 60 continues to monitor the channel 30 for a predefined time period in the event that transmission of the data signal recovers. If the time period expires without recovery of the data signal, the receiver 25 can be powered down for repair.

It will be appreciated that VGA 95 and/or VGA 70 may be implemented by a programmable gain amplifier having a digitally controllable gain.

Figure 5:
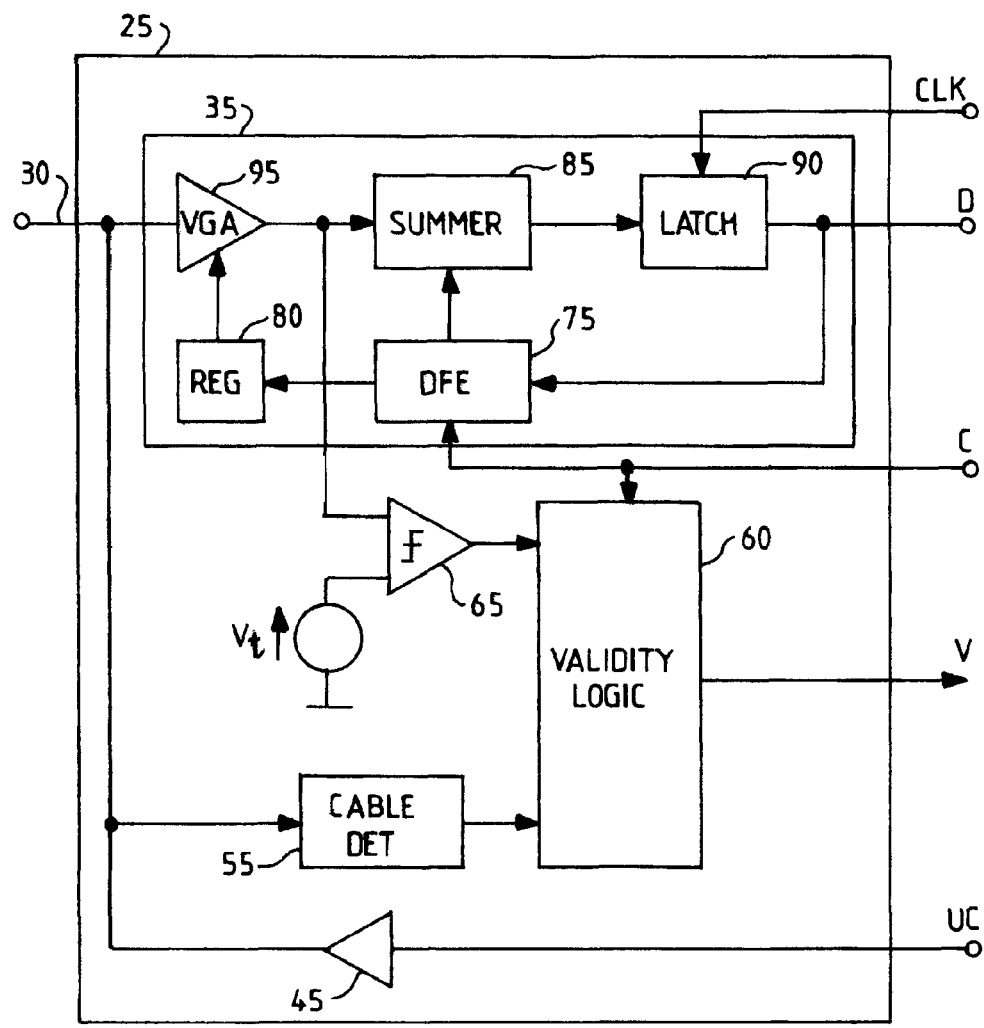
FIG. 5 is a detailed block diagram of another receiver of the data processing system.

Referring to FIG. 5, in another embodiment of the present invention, the VGA 95 is common to both the data path 35 and the signal detector 50. The simplification permits omission of the VGA 70. The output of the VGA 95 is connected to the inputs to the comparator 65 and the summer 85. In this arrangement, the receiver 25 has a signal sensing mode of operation in addition to the aforementioned calibration and data processing modes. In operation, the signal sensing and data processing modes are interleaved so that the validity of the data signal on the channel 30 is periodically checked.

Figure 6:
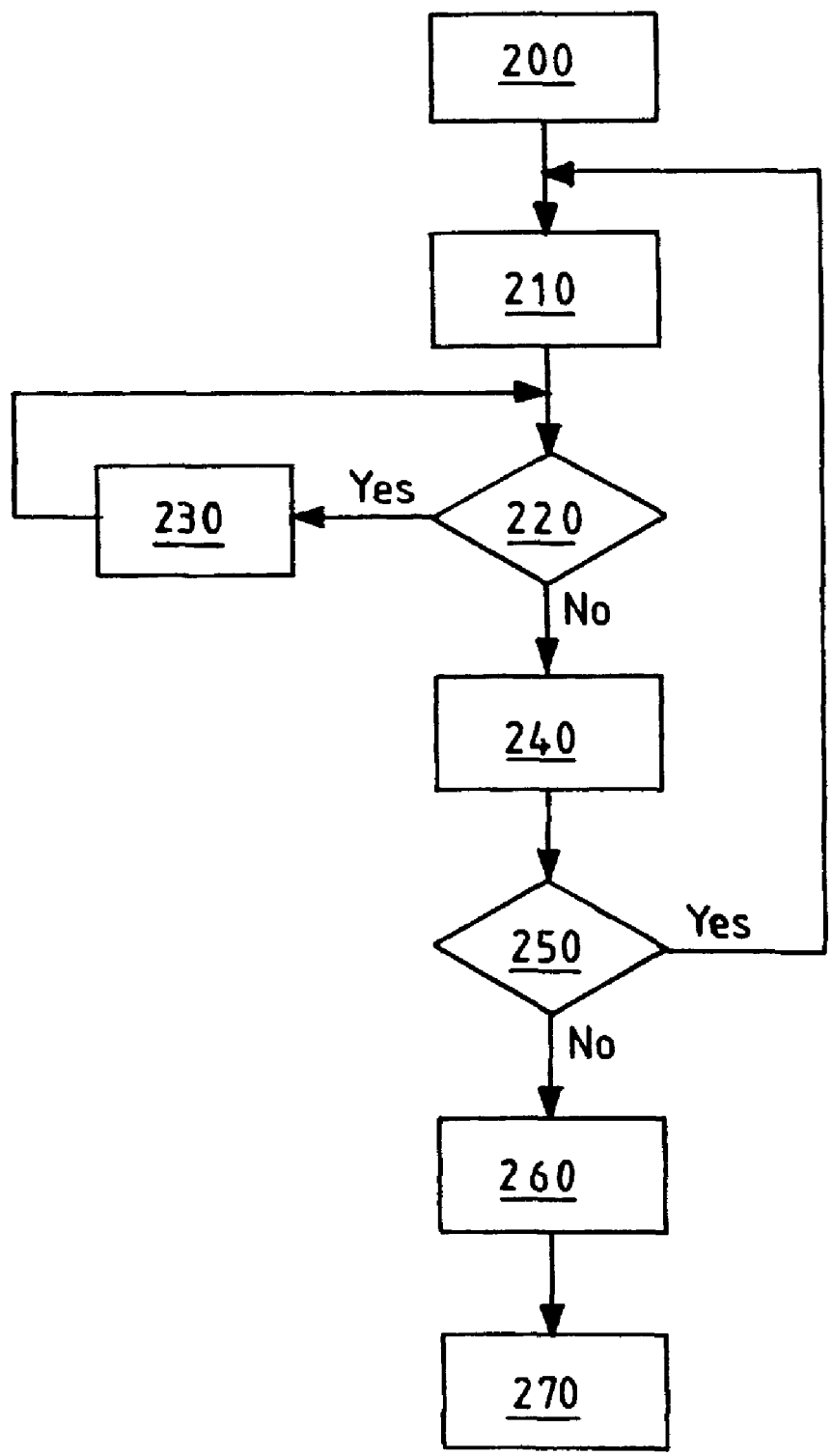
FIG. 6 is a flow chart illustrative of the operation of the receiver.
Figure 7:
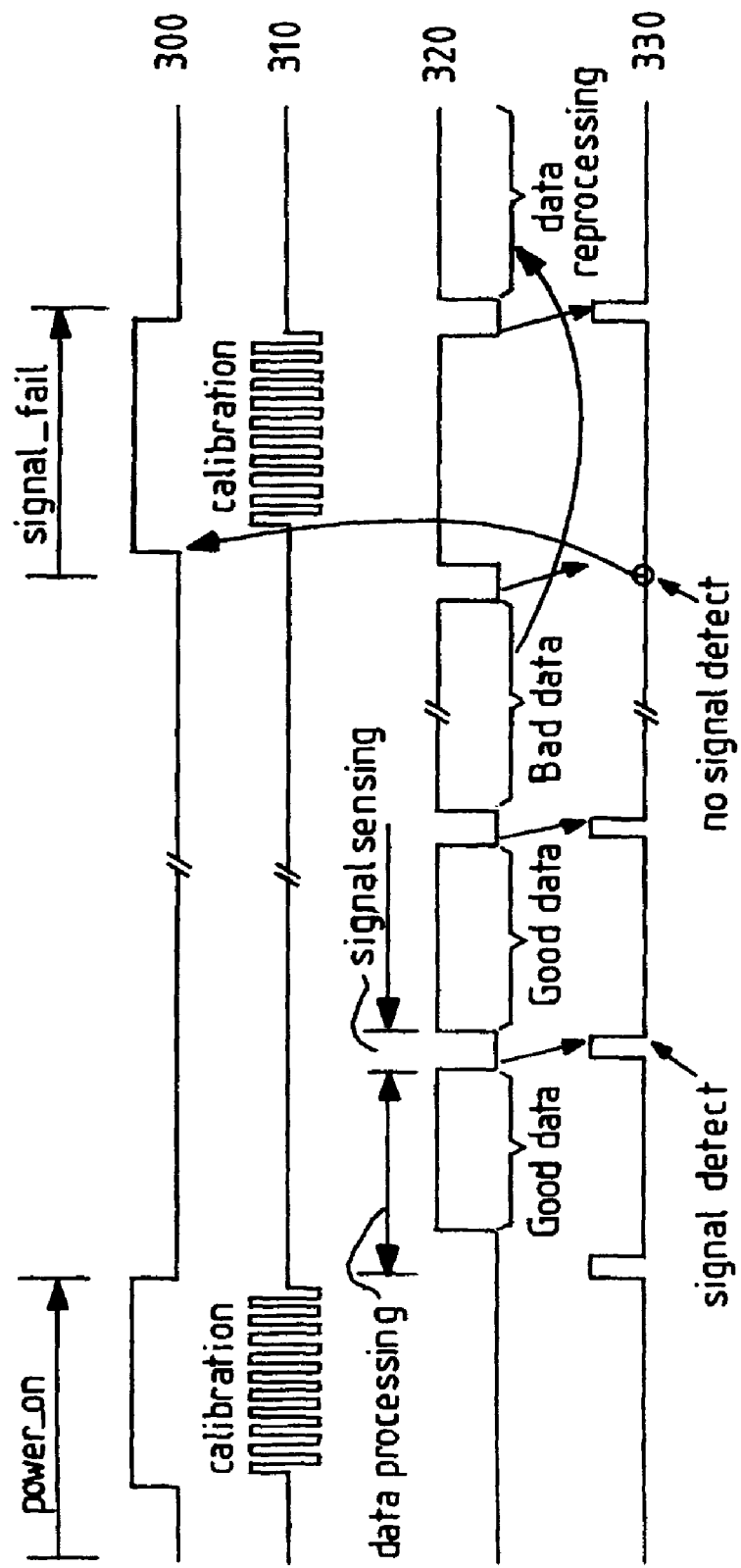
FIG. 7 is a signal diagram illustrative of various signals within the receiver during operation.

An operating protocol for the receiver 25 of FIG. 5 will now be described with reference to the flow chart of FIG. 6 in combination with the signal diagram of FIG. 7.

At power on, block 200, the receiver 25 enters the calibration mode, block 210. The calibration mode may be initiated by a calibration command in the form of a binary control signal 300 from a second DPU 40. Normally, the control signal 300 is at first value. However, when the calibration mode is required, the control signal 300 is set to a second value. In the calibration mode, the aforementioned test signal 310 is fed to the input of the VGA 95. The test signal 310 is utilized to set the reference gain value of the VGA 95 as hereinbefore described. The reference gain value set by the AGC is stored in the register 80. Calibration is then completed. The control signal 300 returns to its normal state. The receiver 25 is then placed in the signal sensing mode, block 220.

In the signal sensing mode, the data path 35 is effectively disabled. The gain of the VGA 95 is set to the reference gain value stored in the register 80. The content of the register 80 is fixed to the reference gain value. Incoming data is received by the VGA 95. The incoming data is amplified by the VGA 95 to produce an amplified signal. The amplified signal is supplied to the comparator 65. The comparator 65 compares the amplified signal to a preset threshold to detect the incoming data. The output of the comparator 65 is supplied to the validity logic 60. If, based on the output from the comparator 65, the validity logic 60 determines that the incoming data is valid, then the receiver 25 is placed in the data processing mode, block 230.

In the data processing mode, the comparator 65 is effectively disabled. The content of the register 80 is released so that the gain of the VGA 95 can be controlled by the AGC loop. The receiver 25 processes incoming data for a preset data processing period during which the gain of the VGA 95 is controlled by the DFE logic 75 via the register 80. In the data processing period, n serial blocks of data are received, where n is an integer. In the data processing mode, the gain of VGA 95 is constantly adjusted by the feedback control from the DFE logic 75 and the register 80 in the AGC loop. In the signal sensing mode, the register 80 is reloaded with the gain value determined during calibration which is then employed to set the gain of the VGA 70 to sense the incoming signal. After each nth block is received, operation of the receiver 25 is returned to the signal sensing mode, block 220.

The signal sensing mode is periodically retriggered by the receiver 25 receiving a signal detection control signal 320 from the second DPU 40. The control signal 320 may be similar to the aforementioned calibration control signal 300. In the signal sensing mode, the signal detection process hereinbefore described is repeated, block 220. If a valid signal is detected, the receiver 25 proceeds to receive next n blocks of data in the data processing mode of operation, block 230. However, if the validity logic 60 detects an invalid signal at the output of the comparator 65, then the data transfer is stopped, block 240. If the data transfer is stopped, the last n blocks of data received are judged to be bad, block 240. The validity logic 60 checks the connection of the channel 30 via the cable detector 55, block 250. If the cable detector 55 detects connection of the channel 30, then the receiver 25 is placed back into calibration mode at block 210. If however, the cable detector 55 detects a fault in the channel 30, then the receiver 25 may periodically poll the channel 30 for a predetermined period to determine if transmission of the data signal recovers. If no such recovery is detected within the predetermined period, then the receiver 25 can be powered down, block 260, for repair, block 270. Trace 330 in FIG. 5 exemplifies the output of the comparator 65 both for tests in which a signal is detected and in which no signal is detected.

In the event that the calibration mode is reactivated, the reference gain value stored in the register 80 may be retained or changed to a new value. Once recalibration is complete, the receiver 25 is placed back in the signal sensing mode. The calibration mode may be invoked for a range of reasons, such as performance variations arising through temperature and other environmental changes.

Depending on the circuit implementation, the gain of the VGA 70 can be defined relatively accurately. This is because the aforementioned circuitry involved in setting the digital value is all sited in the receiver 25. The circuitry involved is thus subject to bias from the same sources. The accuracy with which the gain of the VGA 70 is defined therefore depends mainly on device matching. This can be accurately controlled by integrating all the circuitry involved on a single semiconductor chip.

In a particularly preferred embodiment of the invention, the receiver 25 comprises a SERDES receiver system on a chip having an AGC. The AGC is adapted in such a manner that it can provide gain information to a signal detector 50 of the receiver 25 and other subsystems on the chip. The AGC includes a VGA 95. The gain information to be shared is determined by supplying the VGA 95 with a test signal comprising a stream of training bits with specified format and amplitude. The test signal can be generated either internally or externally to the chip. When a constant amplitude sensor in the DFE logic 75 senses the signal, the corresponding gain coefficient is selected and saved. Once calibration is completed, the system is ready for other signal sensing operations and data transfer. In one embodiments of the present invention hereinbefore described, after "n" packets of data are transferred, the receiver 25 performs a signal detecting operation. All received data is assumed to be valid provided that the subsequent signal is detected to be good. Otherwise, the receiver first checks the cable and related hardware for defects and faults. If no faults are identified, then the receiver may recalibrate and resume data transfer. Otherwise the receiver can be powered down for repair, loops while waiting for good data, or reports a fault.

In a particularly preferred example of the present invention, there is provided a data communications system comprising a receiver 25 having: a data path 35 for receiving a data input signal from a communication channel 30, the data path 35 including a VGA 95 for amplifying the data signal and an AGC for controlling the gain of the VGA 95; a signal detector 50 having a VGA 70 for amplifying the data signal and a comparator 65 for comparing the data signal with threshold value to determine the validity of the data signal; an up channel driver 45 or wrap path; wherein a signal source of known amplitude is employed, via the up channel driver 45 or wrap path, to provide an known input to the AGC in the data path such that a reference gain value for the VGA 70 of the signal detector 50 can be determined. Such reference gain information may also be employed to calibrate other circuits within the receiver 25. The calibration information from the AGC may be used directly with the VGA 70 of the signal detector 50 or used for another circuit having a gain which is known relative to the VGA 95 of the data path 35. In a preferred example of the present invention, data receipt is interleaved with periodic testing of the validity of data signal. This allows the sharing of circuit function, specifically a VGA, between the data path 35 and the signal detector 50.

In the embodiments of the present invention hereinbefore described, gain information from the AGC in the data path 25 is employed to control the gain of the VGA 70 in the signal detector 50. In other embodiments of the present invention, the gain information from the AGC may be employed to control the threshold of the comparator 65 in the signal detector 50. In such embodiments, a digital to analogue converter (DAC) may be employed to convert the gain information in digital form to an analogue threshold level at the comparator 65.

In the embodiments of the present invention hereinbefore described, the gains of VGA 70 and VGA 95 are digitally controlled. However, it will be appreciated that, in other embodiments of the present invention, the gain control inputs of VGA 70 and VGA 95 may be instead responsive to analogue control signals. It will be recognized that many functions within embodiments of the present invention may be implemented with analogue electronic circuitry. For example, in some such embodiments, the registers 80 and 100 may be implemented by sample and hold circuits. Analogue implementations of other features of the present invention will be apparent to those skilled in the art. It will be appreciated by such individuals that many variations of the preferred embodiments herein before described are possible without departing from the scope of the present invention.

Figure 8:
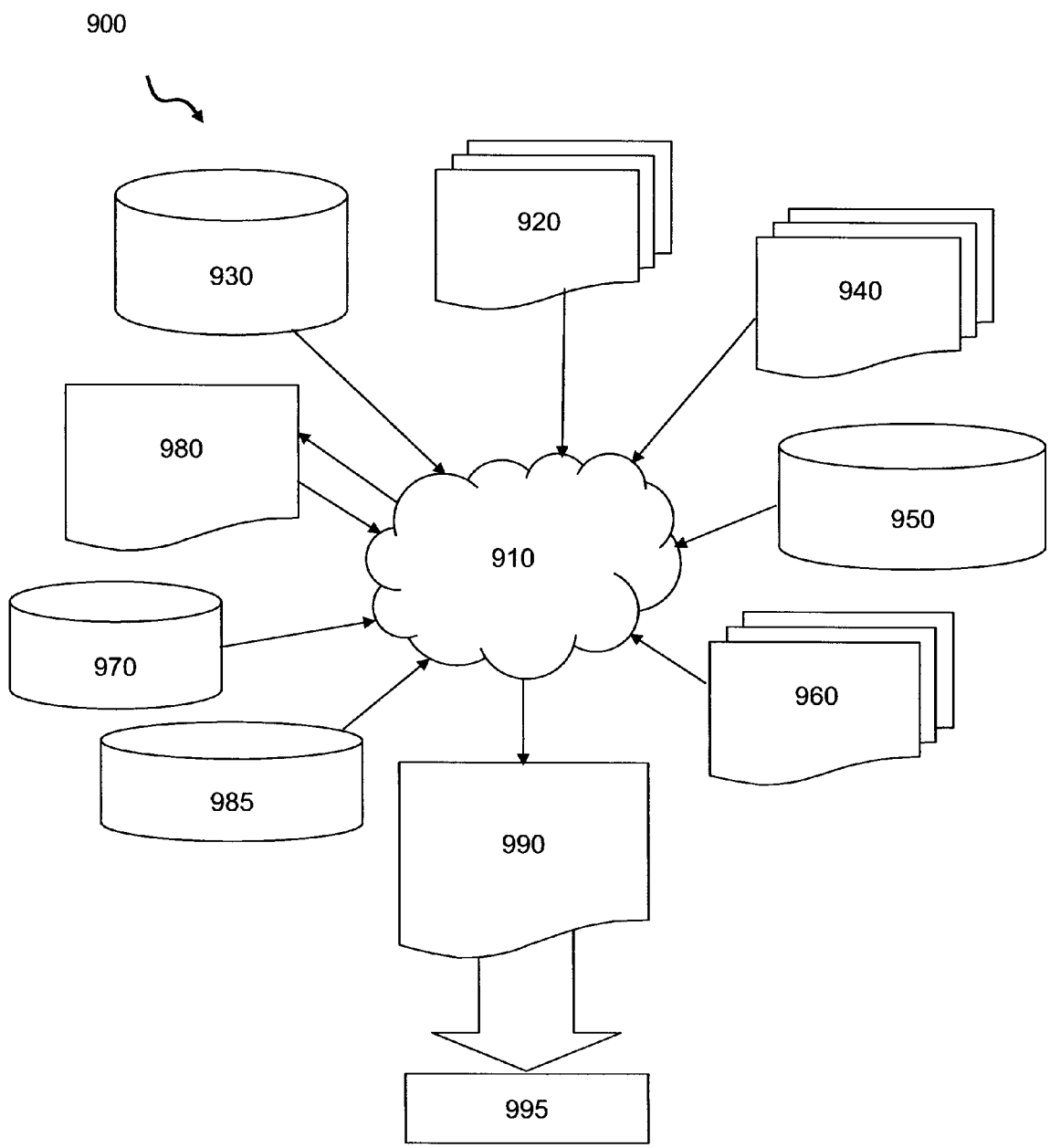
FIG. 8 is a flow diagram of a design process used in semiconductor design, manufacture, and/or test.

FIG. 8 shows a block diagram of an exemplary design flow 900 used for example, in semiconductor design, manufacturing, and/or test. Design flow 900 may vary depending on the type of IC being designed. For example, a design flow 900 for building an application specific IC (ASIC) may differ from a design flow 900 for designing a standard component or from a design from 900 for instantiating the design into a programmable array, for example a programmable gate array (PGA) or a field programmable gate array (FPGA) offered by Altera® Inc. or Xilinx® Inc. Design structure 920 is preferably an input to a design process 910 and may come from an IP provider, a core developer, or other design company or may be generated by the operator of the design flow, or from other sources. Design structure 920 comprises an embodiment of the invention as shown in FIGS. 1-5 in the form of schematics or HDL, a hardware-description language (e.g., Verilog, VHDL, C, etc.). Design structure 920 may be contained on one or more machine readable medium. For example, design structure 920 may be a text file or a graphical representation of an embodiment of the invention as shown in FIGS. 1-5. Design process 910 preferably synthesizes (or translates) an embodiment of the invention as shown in FIGS. 1-5 into a netlist 980, where netlist 980 is, for example, a list of wires, transistors, logic gates, control circuits, I/O, models, etc. that describes the connections to other elements and circuits in an integrated circuit design and recorded on at least one of machine readable medium. For example, the medium may be a CD, a compact flash, other flash memory, a packet of data to be sent via the Internet, or other networking suitable means. The synthesis may be an iterative process in which netlist 980 is resynthesized one or more times depending on design specifications and parameters for the circuit.

Design process 910 may include using a variety of inputs; for example, inputs from library elements 930 which may house a set of commonly used elements, circuits, and devices, including models, layouts, and symbolic representations, for a given manufacturing technology (e.g., different technology nodes, 32 nm, 45 nm, 90 nm, etc.), design specifications 940, characterization data 950, verification data 960, design rules 970, and test data files 985 (which may include test patterns and other testing information). Design process 910 may further include, for example, standard circuit design processes such as timing analysis, verification, design rule checking, place and route operations, etc. One of ordinary skill in the art of integrated circuit design can appreciate the extent of possible electronic design automation tools and applications used in design process 910 without deviating from the scope and spirit of the invention. The design structure of the invention is not limited to any specific design flow.

Design process 910 preferably translates an embodiment of the invention as shown in FIGS. 1-5, along with any additional integrated circuit design or data (if applicable), into a second design structure 990. Design structure 990 resides on a storage medium in a data format used for the exchange of layout data of integrated circuits and/or symbolic data format (e.g. information stored in a GDSII (GDS2), GL1, OASIS, map files, or any other suitable format for storing such design structures). Design structure 990 may comprise information such as, for example, symbolic data, map files, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1-5. Design structure 990 may then proceed to a stage 995 where, for example, design structure 990: proceeds to tape-out, is released to manufacturing, is released to a mask house, is sent to another design house, is sent back to the customer, etc.

What is claimed is:

1. A non-transitory machine-readable medium thereupon stored a design structure, the design structure comprising a receiver for a data communications system, the receiver comprising:
   a data path for receiving a data signal from a data channel, the data path comprising an automatic gain control (AGC) loop;
   a signal detector, outside said AGC loop, the signal detector comprising a comparator for comparing the data signal to a threshold for generating a data valid signal indicative of the validity of the data signal in response to detection of the data signal on the channel exceeding the threshold and in dependence upon gain information from the AGC loop in the data path; and
   a variable signal source for setting the threshold in dependence upon the gain information from the data path.

2. The non-transitory machine-readable medium of claim 1, wherein the design structure comprises the receiver and wherein the data path comprises a variable gain amplifier (VGA) for amplifying the data signal, the VGA having a gain control input connected to the AGC loop, the output of the VGA being connected to the comparator, the receiver further comprising logic connected to the gain control input of the VGA for alternately varying the gain of the VGA via the AGC loop in a data processing period and setting the gain of the VGA to a reference value during a signal sensing period, the reference value being defined via the AGC loop during a calibration of the receiver.

3. The non-transitory machine-readable medium of claim 1, wherein the design structure comprises the receiver and wherein the data path comprises a first variable gain amplifier (VGA) for amplifying the data signal, the first VGA having a gain control input connected to the AGC loop; and, the signal detector comprises a second VGA for amplifying the data signal, the receiver further comprising logic for setting the contents of a register to a reference value defined via the AGC loop during a calibration of the receiver.

4. The non-transitory machine-readable medium of claim 2, wherein the design structure comprises the receiver and the receiver comprising circuitry for applying a preset test signal to the data path and the signal detector during calibration.

5. The non-transitory machine-readable medium of claim 1, wherein the design structure comprises the receiver and wherein the AGC loop comprises decision feedback equalization.

6. A non-transitory machine-readable medium thereupon stored a design structure, the design structure comprising a data communications system, the data communication system comprising a first data processing node and a second data processing node interconnected by a data communications channel, wherein at least one of the first and second nodes comprises a receiver comprising:
    a data path for receiving a data signal from a data channel, the data path comprising an automatic gain control (AGC) loop;
    a signal detector outside said AGC loop, the signal detector comprising a comparator for comparing the data signal to a threshold for generating a data valid signal indicative of the validity of the data signal in response to detection of the data signal on the channel exceeding the threshold and in dependence upon gain information from the AGC loop in the data path; and
    a variable signal source for setting the threshold in dependence upon the gain information from the data path.

* * * * *